United States Patent [19]

Froeliger

[11] 4,027,365

[45] June 7, 1977

[54] METHOD FOR REMOVING AND RE-INSTALLING THE CRANK-SHAFT OF AN INTERNAL COMBUSTION ENGINE AND DEVICE FOR CARRYING OUT THE SAID METHOD

[75] Inventor: Jacques Ernest Maurice Froeliger, Le Blanc Mesnil, France

[73] Assignee: Societe d'Etudes de Machines Thermiques, Saint Denis, France

[22] Filed: Aug. 15, 1975

[21] Appl. No.: 605,078

[30] Foreign Application Priority Data

Aug. 26, 1974 France .............................. 74.29163

[52] U.S. Cl. .................. 29/156.4 R; 29/401 F; 29/426; 29/428; 123/195 R; 123/DIG. 6
[51] Int. Cl.² ................... B23P 15/00; B23P 7/00; F02F 7/00
[58] Field of Search ...... 29/156.4 R, 401 F, 401 R, 29/426, 428, 464; 123/DIG. 6, 195 R

[56] References Cited

UNITED STATES PATENTS

| 870,001 | 11/1907 | Way | 123/DIG. 6 |
|---|---|---|---|
| 1,286,435 | 12/1918 | Slate | 123/DIG. 6 |
| 1,317,395 | 9/1919 | Rotter | 92/128 |
| 2,025,353 | 12/1935 | Mahler | 92/128 |
| 3,319,326 | 5/1967 | Unglesby | 29/283 |
| 3,786,796 | 1/1974 | Okazaki | 123/195 R |

FOREIGN PATENTS OR APPLICATIONS

| 4,897 | 1/1907 | United Kingdom | 29/156.4 R |
|---|---|---|---|
| 21,332 | 8/1906 | United Kingdom | 123/DIG. 6 |

*Primary Examiner*—C.W. Lanham
*Assistant Examiner*—Daniel C. Crane
*Attorney, Agent, or Firm*—Jay L. Chaskin

[57] ABSTRACT

Method and device for removing the crank-shaft of an internal combustion engine, wherein the frame of the engine is tilted on one side about an axis parallel with the center-line of the crank-shaft, and said crank-shaft is extracted from below.

6 Claims, 4 Drawing Figures

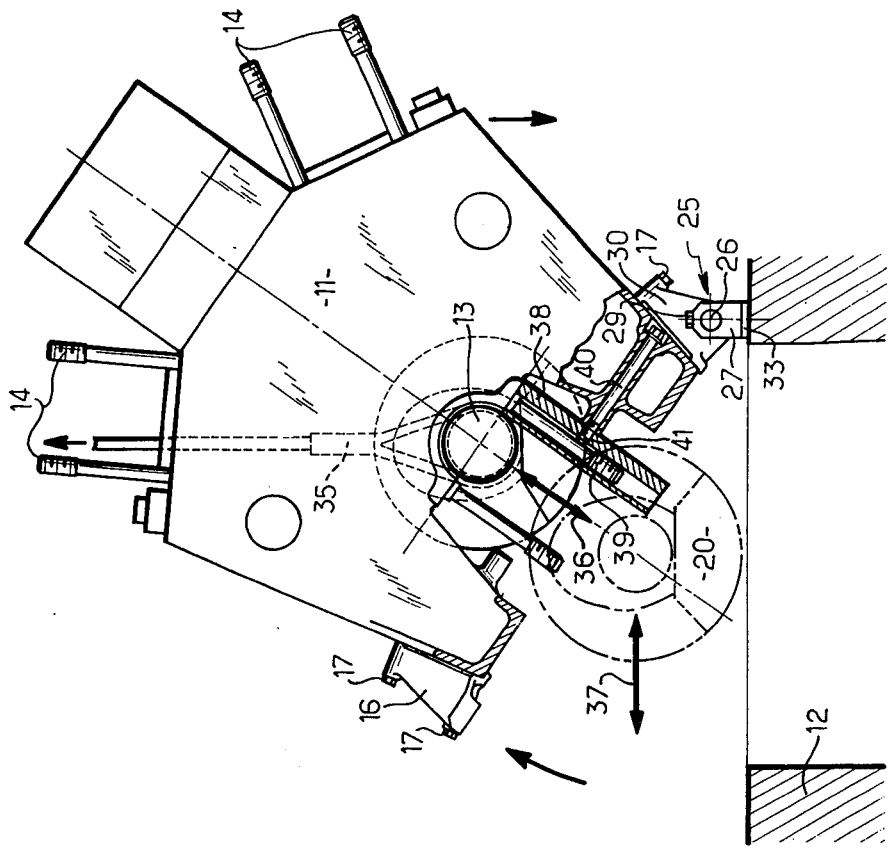
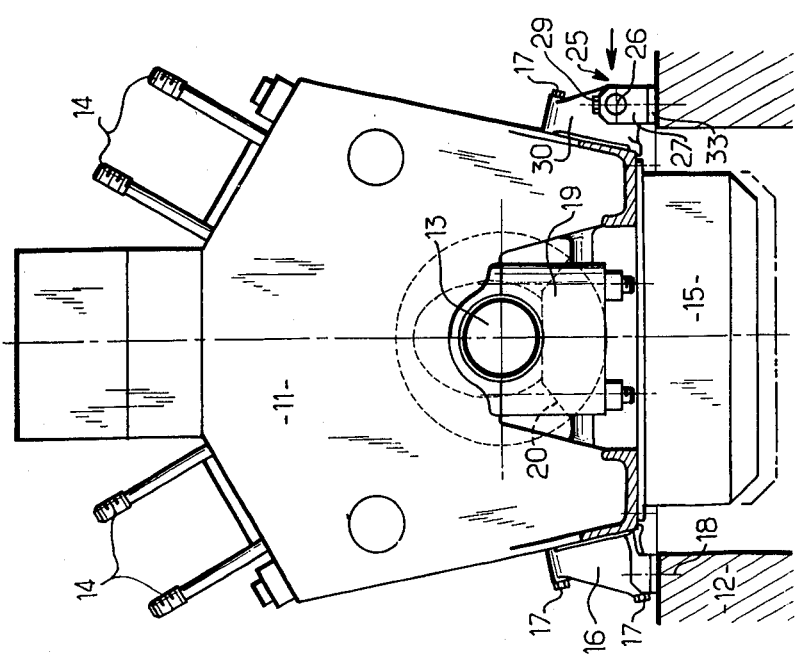

METHOD FOR REMOVING AND RE-INSTALLING THE CRANK-SHAFT OF AN INTERNAL COMBUSTION ENGINE AND DEVICE FOR CARRYING OUT THE SAID METHOD

The present invention relates to and has essentially for its object the removing and re-installing, from below, of the crank-shaft of an internal combustion engine. The invention has been more particularly developed for the high-power Diesel engines with which some ships are equipped and for which little room and little equipment are available to carry out such works. However, its principle may be extended to all types of stationary or on-board engines.

The replacement of a crank-shaft is one of the most complicated and expensive works among all the repair or maintenance works which may occur during the life of an engine. In particular, in replacing an engine aboard a ship, the whole engine has generally to be lifted vertically, for example by means of a crane, and maintained in that position during the whole time necessary to remove and/or re-install the crank-shaft from below. Moreover, this handling step cannot be carried out unless a sufficiently powerful crane (or other lifting means of the same type) and a sufficiently free upper-space are available aboard the ship. If sufficient lifting means are not available, there remains the solution consisting in raising the engine by means of jacks or actuating cylinders to a sufficient height. This last step is toilsome and difficult owing to the wedges or props which have to be successively stacked in order to obtain the necessary lifting height, which is much greater than the normal travel of an actuating cylinder or the like. Moreover, in this last case, the wedges or props and/or the actuating cylinders are considerably troublesome owing to the fact that the crank-shaft is generally longer than the engine frame, thus preventing a lateral freeing of the said crank-shaft, so that the latter has to be removed vertically (and not laterally) and then taken out from under the basis of support of the engine frame by being pulled askew and by several stages, so as to avoid hitting the wedges or props. This step must not be underestimated in view of the weight of the crank-shaft which, in the larger engines, may vary between 1,700 and 2,800 kg.

The present invention relates essentially to a novel, much more rational method allowing the crank-shaft be taken out laterally, at once.

More precisely, the invention relates to a method for removing the crank-shaft of an internal combustion engine, consisting in taking off the cylinder heads, the pistons, the connecting rods and at least the fastenings of the supports normally maintaining the engine frame in place on its base or its supporting structure, then removing the crank-shaft bearing caps and extracting the said crank-shaft from below, characterized in that it consists, preferably before removing the said crank-shaft bearing caps, in tilting the said frame on one side about a geometrical axis substantially parallel with the centre-line of the said crank-shaft to a predetermined angular position, in maintaining it in that position and in freeing, if necessary, the crank-shaft outlet space thus provided under the said frame.

The invention also comprises a device or device elements allowing the said method to be carried out.

The invention will be better understood and other purposes, details and advantages of the latter will appear more clearly from the following explanatory description given by way of example only, with reference to the appended drawings wherein:

FIG. 1 shows an engine frame placed on its base just before the crank-shaft removing step, the elements of the hinged connection system for the tilting of the engine being already mounted;

FIG. 2 is a view illustrating the removing step proper, and partially broken away to show an element for guiding the shaft;

Figure 3:
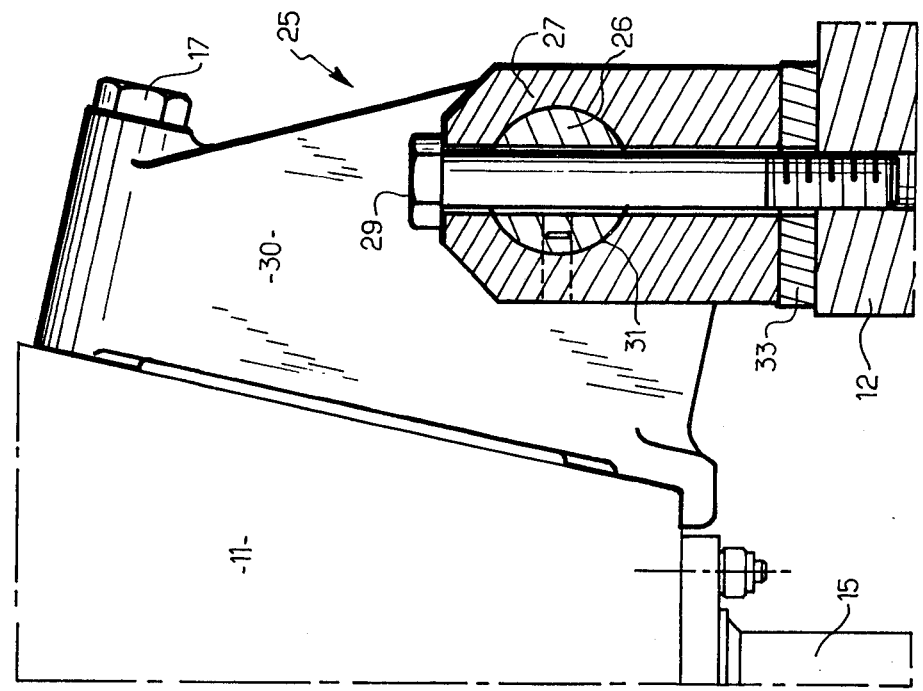
FIG. 3 shows an aforesaid element of the hinged connection system, mounted in position.

Referring now more particularly to FIG. 1, an engine frame 11 is shown in position on its base or supporting structure 12, just before the removal of the crank-shaft 13. The engine 11 is thus shown without the cylinder heads, the pistons and the connecting rods. Only the cylinder-head pull-bars 14 may be left in place. The engine rests upon the base 12, above an oil pan 15, through the medium of supports 16 which, in normal time, maintain the frame 11 on the base 12. These supports are secured to the frame by screws 17 and to the base by other screws (symbolized in the drawings by the centre-line 18) and they are normally arranged at regular intervals on either side of the frame 11 with respect to the longitudinal axis of the latter. In FIG. 1 the crank-shaft 13 is shown to be still in place, with the bearing caps 19 and the counter-weights 20.

The side on which the engine frame is arranged to be tilted being the right side in the drawings, it is sufficient to remove the fastenings of the supports 16 to the base 12 (the fastening screws 17 remaining in place) on the left side of the frame, whereas it is necessary to completely remove the supports 16 on the right side, i.e. on the tilting side.

According to the invention, a certain number of supports 16 on the tilting side (at least two and preferably near the ends of the frame) are replaced by hinged supports 25 comprising a hinge pin 26 parallel with the longitudinal axis of the engine.

Figure 4:
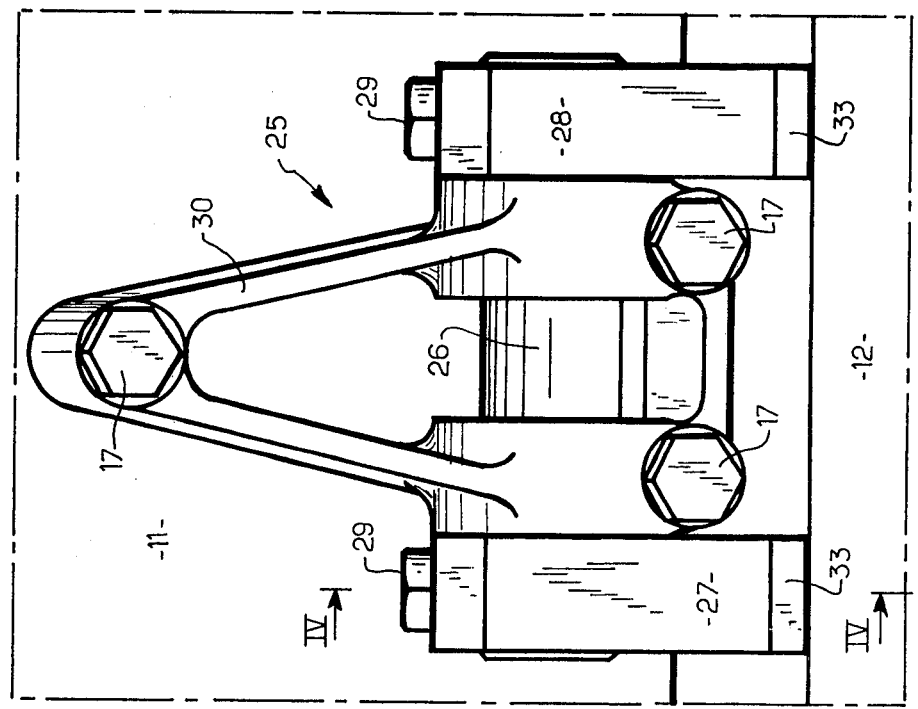
FIG. 4 is a sectional view upon IV—IV of FIG. 3.

FIGS. 3 and 4 show more in detail the structure of these hinged supports. Each of them is constituted by two parallel upright legs 27 and 28 mounted on the base 12 (by means of screws 29) at the foot of the frame 11, at selected locations, i.e. on either side of the stationary supports 16 intended to be replaced by the said hinged support 25. Between the said upright legs is placed the pivoting portion 30 of the said hinged support. The pivoting portion 30 is provided with a bore 31 in its lower portion, allowing its rotation about the pin 26 which is immobilized and secured between the upright legs 27 and 28 by means of the screws 29. The fixing of the upright legs 27 and 28 may include the mounting of wedges 33 if necessary. The pivoting portion 30 is advantageously so conformed as to have a shape comparable with the corresponding portion of the stationary support which it replaces and, in particular, the said pivoting portion 30 is provided with means for fastening the same to the frame which are identical with those of the stationary supports 16, so that the same screws 17 may be re-utilized for securing the hinged supports to the frame. Likewise, the whole hinged support 25, once mounted, has a general shape substantially comparable with that of the stationary support 16 which it replaces.

FIG. 2 illustrates more particularly the crank-shaft removing step. The latter is shown in two positions on the same Figure, i.e., on the one hand, placed in position, the bearing caps being removed and the shaft itself being maintained by slings 35, and, on the other hand, during its extraction. The arrows 36 and 37 indicate the directions of lateral displacement in which the shaft is extracted from the frame before being laid down on the base 12, according to a process which will be analyzed later.

Another device is shown in FIG. 2; it is a guide element 38 passed onto some of the bearing cap pull-bars 39, each of the said elements being maintained in place owing to a threaded hole 41 and to the corresponding bearing side-screw 40 normally serving to secure the cap 19.

The removing work is carried out in the following manner.

The hinged supports 25 being put in place, the fastenings of the supports 16 located on the side opposite to the tilting being taken off and the supports 16 on the tilting side being removed, the frame tilted to the angular position shown in FIG. 2 and is maintained in that position. The tilting may be performed by any known means. For example and preferably, a pulley-block or a crane (not shown) may be used. If its use is not possible, recourse may be had to the technique mentioned above using actuating cylinders and wedges or props. According to an important feature of the method of the present invention, the frame is maintained in the position shown in FIG. 2 by means which may be independent of the lifting means. Thus, if the pulley-block or the crane has been used for the lifting, the same means may serve to maintain the frame in that position. On the other hand, if the jacks or the actuating cylinders have been used, the frame may be maintained in the angular position shown by being connected by means of cables or slings (not shown for the sake of clarity in the drawings) attached between the frame on the one hand and a stationary wall on the other hand. It is then possible, after thus immobilizing the frame, to remove the wedges, jacks or actuating cylinders which have been used for the lifting and which would constitute, if they will be left in place, an obstacle to the extraction of the crank-shaft. In this manner, the outlet space for the crank-shaft below the engine is completely freed whatever the lifting means used. After this tilting step there remains to remove the caps 19 and to move down the shaft 13 by lowering the slings 35. In the first place the shaft 13 moves down laterally by bearing upon the guides 38 (arrow 36) and then is displaced horizontally (arrow 37) onto the base 12 by bearing for example upon beams (not shown) arranged for this purpose crosswise above the location of the oil pan.

The same method may of course be used with the same device elements to re-install the crank-shaft, by effecting the contrary operations to those which have just been described in a correct sequence.

Of course the invention is by no means limited to the form of embodiment just described, which has been given by way of example only. It comprises all the methods and means constituting technical equivalents to the methods and means employed, should the latter be used within the scope of the following claims.

What is claimed is:

1. A method for removing or reinstalling the crankshaft of an engine, said engine having a frame mounted on a base by fastening and support means, the crankshaft having bearing caps and being located in said frame comprising the steps of releasing the frame fastening means, rotating the entire frame including said crankshaft about an axis substantially parallel with the center-line of the crankshaft, removing the crankshaft bearing caps, and while the frame is in the rotated position, extracting the crankshaft from below the engine by supporting the crank-shaft and allowing the crankshaft to be moved by gravity along a slanted guiding means until the crankshaft reaches the level of the base.

2. The method according to claim 1 wherein the extraction of the crankshaft comprises the steps of slinging the crankshaft, moving the crankshaft into an outlet space and sliding the crankshaft laterally.

3. The method according to claim 2 wherein the sling is at substantially each end of the cranskshaft.

4. The method according to claim 1 wherein the axis of rotation is a hinged support.

5. The method according to claim 1 wherein at least two released fastening and support means on the same side of the engine are replaced by two hinged supports, the hinges comprising the geometric axis of rotation.

6. The method according to claim 1 wherein the axis of rotation is below the center-line of the crankshaft.

* * * * *